US008155399B2

(12) United States Patent
Liu et al.

(10) Patent No.: US 8,155,399 B2
(45) Date of Patent: Apr. 10, 2012

(54) GENERIC FACE ALIGNMENT VIA BOOSTING

(75) Inventors: Xiaoming Liu, Schenectady, NY (US); Peter Henry Tu, Niskayuna, NY (US); Frederick Wilson Wheeler, Niskayuna, NY (US)

(73) Assignee: UTC Fire & Security Corporation, Farmington, CT (US)

( * ) Notice: Subject to any disclaimer, the term of this patent is extended or adjusted under 35 U.S.C. 154(b) by 1050 days.

(21) Appl. No.: 12/056,051

(22) Filed: Mar. 26, 2008

(65) Prior Publication Data
US 2008/0310759 A1 Dec. 18, 2008

Related U.S. Application Data

(60) Provisional application No. 60/943,316, filed on Jun. 12, 2007.

(51) Int. Cl.
*G06K 9/62* (2006.01)
(52) U.S. Cl. .......................... 382/118; 382/160; 382/294
(58) Field of Classification Search ........................ None
See application file for complete search history.

(56) References Cited

U.S. PATENT DOCUMENTS

| 7,324,671 | B2 | 1/2008 | Li et al. | |
|---|---|---|---|---|
| 7,756,302 | B2* | 7/2010 | Matsuzaka et al. | 382/118 |
| 2007/0223790 | A1 | 9/2007 | Xiao et al. | |
| 2008/0378380 | | 2/2008 | Mihai et al. | |
| 2008/0063263 | A1* | 3/2008 | Zhang et al. | 382/159 |
| 2008/0632630 | | 3/2008 | Li et al. | |
| 2008/0292200 | A1* | 11/2008 | Kjeldsen et al. | 382/254 |
| 2009/0226081 | A1* | 9/2009 | Zhou et al. | 382/159 |

OTHER PUBLICATIONS

Papageorgiou, Constantine P., Michael, Oren and Poggio, Tomaso; A General Framework for Object Detection; Center for Biological and Computational Learning Artificial Intelligence Laboratory; MIT; Cambridge, MA 02139.
Cootes, Timothy F., Edwards, Gareth J., and Taylor, Christopher J.; Active Appearance Models, vol. 23, No. 6; Jun. 2001.
Matthews, Iain and Baker, Simon; Active Appearance Models Revisited; The Robotics Institute, Carnegie Mellon University; Revised Jan. 29, 2004, Accepted Feb. 4, 2004.
Hu, Changbo, Feris, Rogerio, and Turk, Matthew; Active Wavelet Networks for Face Alignment; Computer Science, University of California, Santa Barbara.
Batur, Aziz Umit and Hayes, Monson H.; Adaptive Active Appearance Models; IEEE Transactions on Image Processing, vol. 14, No. 11, Nov. 2005.

(Continued)

*Primary Examiner* — Brian Werner
(74) *Attorney, Agent, or Firm* — MH2 Technology Law Group LLP

(57) ABSTRACT

There is provided a discriminative framework for image alignment. Image alignment is generally the process of moving and deforming a template to minimize the distance between the template and an image. There are essentially three elements to image alignment, namely template representation, distance metric, and optimization method. For template representation, given a face dataset with ground truth landmarks, a boosting-based classifier is trained that is able to learn the decision boundary between two classes—the warped images from ground truth landmarks (e.g., positive class) and those from perturbed landmarks (e.g., negative class). A set of trained weak classifiers based on Haar-like rectangular features determines a boosted appearance model. A distance metric is a score from the strong classifier, and image alignment is the process of optimizing (e.g., maximizing) the classification score. On the generic face alignment problem, the proposed framework greatly improves the robustness, accuracy, and efficiency of alignment.

20 Claims, 12 Drawing Sheets

OTHER PUBLICATIONS

Friedman, Jerome, Hastie, Trevor, and Tibshirani, Robert; Additive Logistic Regression A Statistical View of Boosting; Aug. 20, 1998; Stanford University.

Meir, Ron and Ratsch, Gunnar; An Introduction to Boosting and Leveraging; Dept of Electrical Engineering, Technion, Haifa 32000, Israel.

Baker, Simon, Matthews, Iain, and Schneider, Jeff; Automatic Construction of Active Appearance Models as an Image Coding Problem; IEEE Transactions on Pattern Analysis and Machine Intelligence, vol. 26, No. 10; Oct. 2004.

Shum, Heung-Yeung and Szeliski, Robert; Construction of Panoramic Image Mosaics with Global and Local Alignment; Microsoft Research.

Hager, Gregory D. and Belhumeur, Peter N.; Efficient Region Tracking with Parametric Models of Geometry and Illumination; IEEE; Transactions on Pattern Analysis and Machine Intelligence, vol. 20, No. 10; Oct. 1998.

Black, Michael J. and Jepson, Allan D.; Eigen Tracking: Robust Matching and Tracking of Articulated Objects Using a View-Based Representation; Xerox Palo Alto Research Center, 3333 Coyote Hill Road, Palo Alto, CA 94304; Department of Computer Science, University of Toronto, Ontario M5S 3H5 and Canadian Institute for Advance Research.

Lienhart, Rainer, Kuranov, Alexander, and Pisarevsky, Vadim; Empirical Analysis of Detection Cascades of Boosted Classifiers for Rapid Object Detection; Microprocessor Research Lab, Intel Labs; Intel Corporation, Santa Clara, CA, USA; MRL Technical Report, May 2002, Revised Dec. 2002.

Jiao, Feng, Li, Stan, Shum, Heung-Yeung, and Schuurmans, Dale; Face Alignment Using Statistical Models and Wavelet Features; Department of Computer Science, University of Waterloo; Waterloo, Canada; Microsoft Research Asia, Beijing, China; 2003 IEEE.

Yan, Shuicheng, Liu, Ce, Li, Stan Z., Zhang, Hongjiang, Shum, Heung-Yeung, and Cheng, Qiansheng; Face Alignment Using Texture-Constrained Active Shape Models; Department of Info. Sci., School of Mathematical Science, Peking University, Peking 100871, People's Republic of China; Microsoft Reserach Asia, Beijing Sigma Center, Beijing 100080, People's Republic of China; 2002 Elsevier Science B.V.

Chang, Kyong I., Bowyer, Kevin W., and Flynn, Patrick J.; Face Recognition Using 2D and 3D Facial Data; Computer Science & Engineering Department, University of Notre Dame, Notre Dame, IN; Dec. 2003, Santa Barbara, California.

Hidaka, Akinori, Nishida, Kenji, and Kurita, Takio; Face Tracking by Maximizing Classification Score of Face Detector Based on Rectangle Features; University of Tsukuba; Ibaraki-ken, Japan; IEEE International Conference on Computer Vision Systems, 2006.

Cristinacce, D., and Cootes, T. F.; Facial Feature Detection and Tracking with Automatic Template Selection; University of Manchester, Manchester, M13 9PT, U.K.

Stegmann, Mikkel B., Ersboll, Bjarne K., and Larsen, Rasmus; FAME—A Flexible Appearance Modeling Environment; IEEE Transactions on Medical Imaging, vol. 22, No. 10, Oct. 2003.

Gross, Ralph, Matthews, Iain, and Baker, Simon; Generic vs. Person Specific Active Appearance Models; The Robotic Institute, Carnegie Mellon University, Pittsburgh, PA; 2005.

Baker, Simon and Matthews, Iain; Lucas-Kanade 20 Years On: A Unifying Framework; The Robotics Institute, Carnegie Mellon University, Pittsburgh, PA; Revised Feb. 6, 2003; Accepted Feb. 7, 2003.

Viola, Paul and Jones, Michael J.; Robust Real-Time Face Detection; Microsoft Research, Redmond, WA; Mitsubishi Electric Research Laboratory, Cambridge, MA; Revised Jul. 10, 2003; Accepted Jul. 11, 2003.

Zhao, Ming, Chen, Chun, Li, Stan Z., and Bu, Jiajun; Subspace Analysis and Optimization for AAM Based Face Alignment; College of Computer Science, Zhejiang University, Hangzhou, 310027, P.R. China; Microsoft Research Asia, Beijing Sigma Center, Beijing, 100080, P.R. China; 2004 IEEE.

Williams, Oliver, Blake, Andrew, and Cipolla, Roberto; Sparse Bayesian Learning for Efficient Visual Tracking; IEEE Transactions on Pattern Analysis and Machine Intelligence, vol. 27, No. 8; Aug. 2008.

Avidan, Shai; Support Vector Tracking; IEEE Transactions on Pattern Analysis and Machine Intelligence, vol. 26, No. 8; Aug. 2004.

Phillips, P. Johathon, Moon, Hyeonjoon, Rizvi, Syed A., and Rauss, Patrick J.; The FERET Evaluation for Face-Recognition Algorithms; IEEE Transactions on Pattern Analysis and Machine Intelligence, vol. 22, No. 10, Oct. 2000.

* cited by examiner

PERCENTAGE OF SQUARE WIDTH w.r.t. FACE WIDTH

GENERIC FACE ALIGNMENT VIA BOOSTING

CROSS REFERENCE TO RELATED APPLICATIONS

This application claims the benefit of U.S. Provisional Application No. 60/943,316, entitled "GENERIC FACE ALIGNMENT VIA BOOSTING," filed on Jun. 12, 2007, which is herein incorporated in its entirety by reference.

STATEMENT REGARDING FEDERALLY SPONSORED RESEARCH & DEVELOPMENT

This invention was made with Government support under contract number 2005-IJ-CX-K060 awarded by the National Institute of Justice (NIJ). The Government has certain rights in the invention.

BACKGROUND

The invention relates generally to image alignment, and more particularly to a system and method for improved facial alignment via a boosted appearance model.

Image alignment is the process of aligning a template to an image. Specifically, the template may be deformed and moved to minimize the distance between the template and the image. Image alignment models include algorithms designed to optimize (e.g., minimize) the distance between the template and a given image. There are generally three elements to image alignment, including template representation, distance measurement, and optimization. An exemplary template may be a simple image patch or may be a more complex template, such as an active shape model (ASM) and/or an active appearance model (AAM). The least square error (LSE) and mean square error (MSE) between the warped image and the template are exemplary distance metrics. Gradient descent methods (e.g., Gauss-Newton, Newton, Levenberg-Marquardt, and so forth) may be employed for optimization.

In AAM, the template representation uses two eigenspaces to model the facial shape and the shape-free appearance, respectively. For the distance metric, the MSE between the appearance instance synthesized from the appearance eigenspace and the warped appearance from the image observation is minimized by iteratively updating the shape and/or appearance parameters. It is well known that AAM-based face alignment has difficulties with generalization. That is, the alignment tends to diverge on images that are not included as the training data for learning the model, especially when the model is trained on a large dataset. In part, this is due to the fact that the appearance model only learns the appearance variation retained in the training data. When more training data is used to model larger appearance variations, the representational power of the eigenspace is very limited even under the cost of a much higher-dimensional appearance subspace, which in turn results in a harder optimization problem. Also, using the MSE as the distance metric essentially employs an analysis-by-synthesis approach, further limiting the generalization capability by the representational power of the appearance model.

Challenges to image alignment may generally include any differences between unknown images and the training data. For example, pose, race, lighting, expression, occlusion, and/or resolution may impair the accuracy of image alignment. Accordingly, it may be desirable to provide an improved model for image alignment which provides for variances in images.

BRIEF DESCRIPTION

According to embodiments of the present technique, methods and systems for image alignment are provided. In one embodiment, the image alignment method includes training an appearance model based on positive and negative classes of input. In another embodiment, the method includes iteratively updating a template algorithm to an image by maximizing a strong classifier score.

A further embodiment provides a method for image alignment including training a shape model with a representative set of images, training an appearance model based on positive and negative classes of input to determine a plurality of weak classifiers based on the positive and negative classes of input, and aligning the template to an image by maximizing a strong classifier based on the weak classifiers.

In addition, there is provided an image alignment method including maximizing a function $$F(p) = \sum_{m=1}^{M} \frac{2}{\pi} \arctan(g_m A_m^T I(W(u; p)) - t_m),$$

wherein p represents shape parameters for an image, m represents an iteration number, $g_m$ has a value of $\pm 1$, $A_m^T$ represents a feature template, $I(W(u;p))$ represents the image warped to a shape template, and $t_m$ represents a threshold. These and other embodiments are described in detail below.

These and other advantages and features will be more readily understood from the following detailed description of preferred embodiments of the invention that is provided in connection with the accompanying drawings.

DRAWINGS

DETAILED DESCRIPTION

Figure 1:
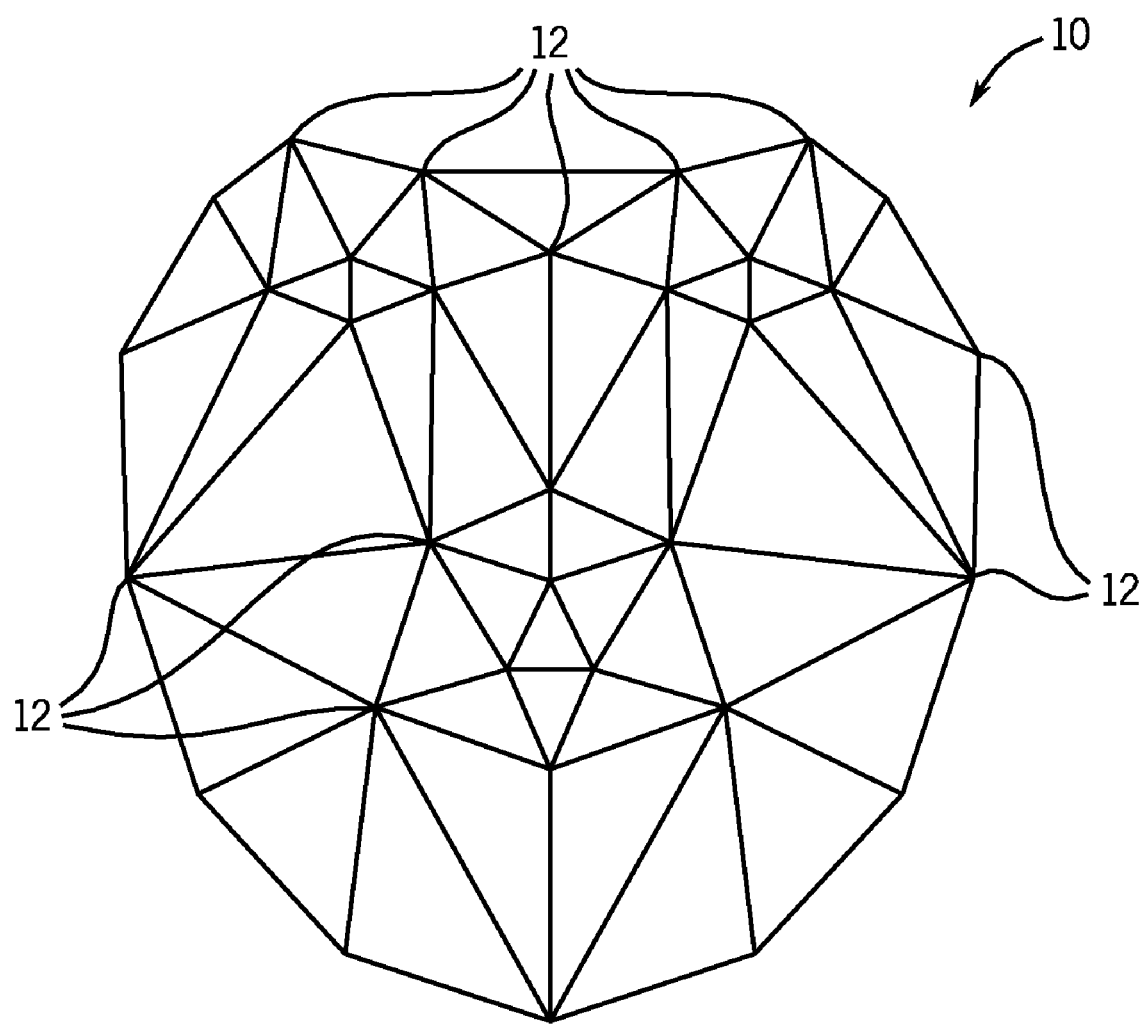
FIG. 1 is an exemplary face shape template in accordance with embodiments of the present disclosure.

Image alignment is the process of moving and deforming a template to minimize the distance between the template and an image. The elements in image alignment may include template representation, distance metric, and optimization method. Generally, the template may include shape and appearance models. Given an image, landmark points may be located to quantify the shape of the image. In facial image alignment, for example, the shape model may include landmark points which correspond to facial features (e.g., tip of nose, corners of mouth, etc.). An exemplary mean shape 10, as illustrated in FIG. 1, may contain landmark points 12. Thirty-three landmark points 12 are denoted by intersections of two or more elements of the shape 10. The template may also include an appearance model, which employs a two-class classifier to optimize the facial alignment, as described below.

Figure 2:
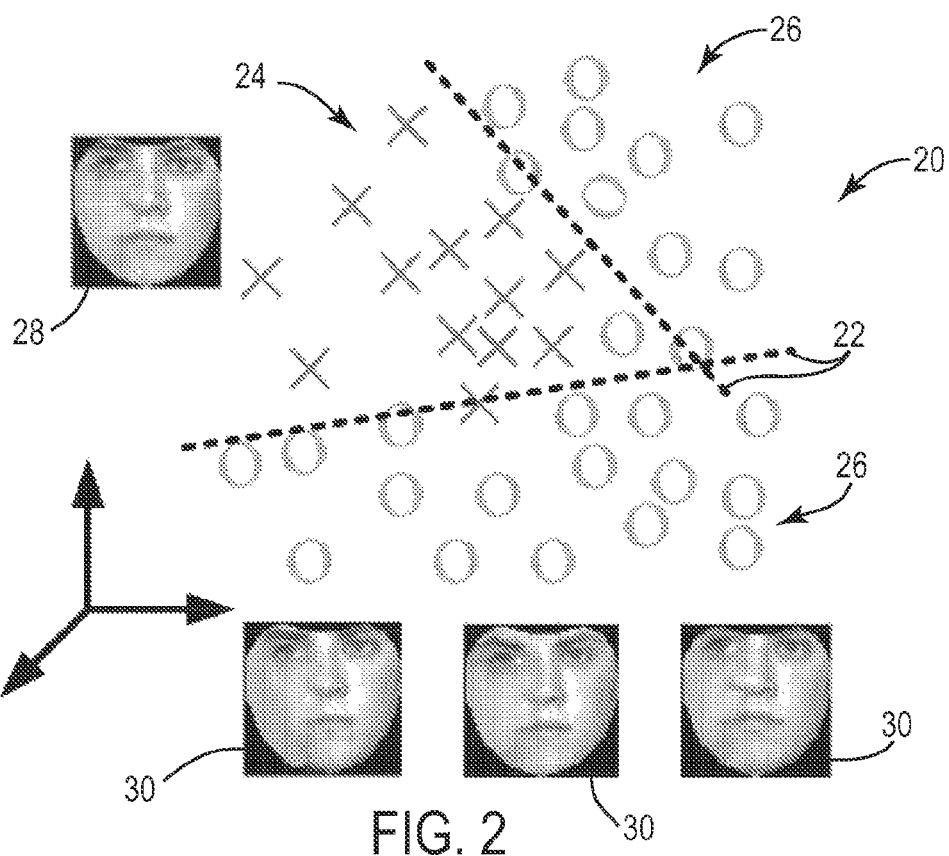
FIG. 2 is a graph illustrating model training using positive and negative images in accordance with embodiments of the present disclosure.

The present technique generally includes two steps for image alignment. The first step, illustrated in FIG. 2, includes model training. As illustrated in a graph 20, for template representation a boosting-based classifier is trained that learns a decision boundary 22 between two classes 24 and 26, given a face dataset with ground truth landmarks. The positive class 24 includes images 28 warped with ground truth landmarks, while the negative class 26 includes images 30 warped with perturbed landmarks (e.g., landmarks which have been intentionally misplaced). The model may learn to distinguish correct alignment (i.e., the positive class 24) from incorrect alignment (i.e., the negative class 26) based on warped images 28 and 30. A set of trained boosting-based weak classifiers, based on Haar-like rectangular features, acts as a boosted appearance model (BAM).

Figure 3:
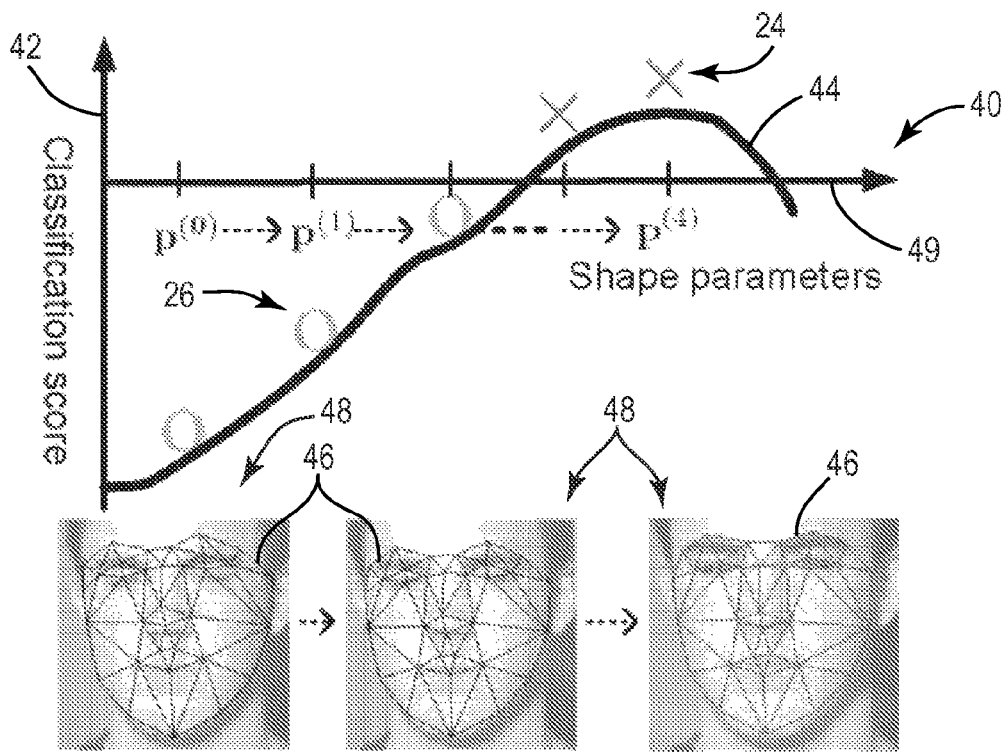
FIG. 3 is a graph illustrating iterative face alignment using a classification score in accordance with embodiments of the present disclosure.

The second step, illustrated in FIG. 3, includes application of the model to images. A graph 40 illustrates optimization of a classification score 42. The classification score 42 may be derived from a trained boosting-based strong classifier (i.e., plot 44) based on the weak classifiers. The strong classifier 44 is a continuous value proportional to the accuracy of alignment, and may be used as the distance metric to align a template 46 to an image 48. As illustrated, the alignment from initial shape parameters $p^{(0)}$ (e.g., x-axis 49) will likely have a negative score 42. The shape parameters 49 are iteratively updated (e.g., $p^{(1)}$, $p^{(2)}$, $p^{(3)}$, etc.) via gradient ascent such that the classification score 42 is maximized.

Shape and Appearance Modeling

Figure 4:
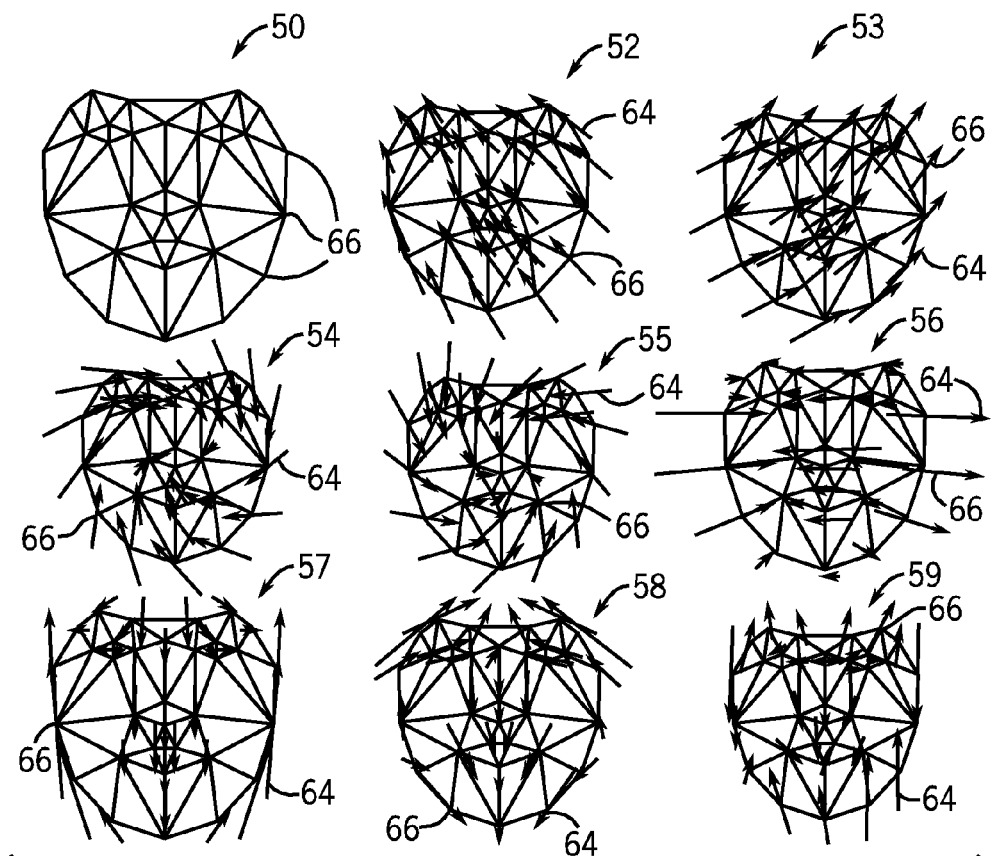
FIG. 4 is a mean shape template and eight shape bases in accordance with embodiments of the present disclosure.
Figure 5:
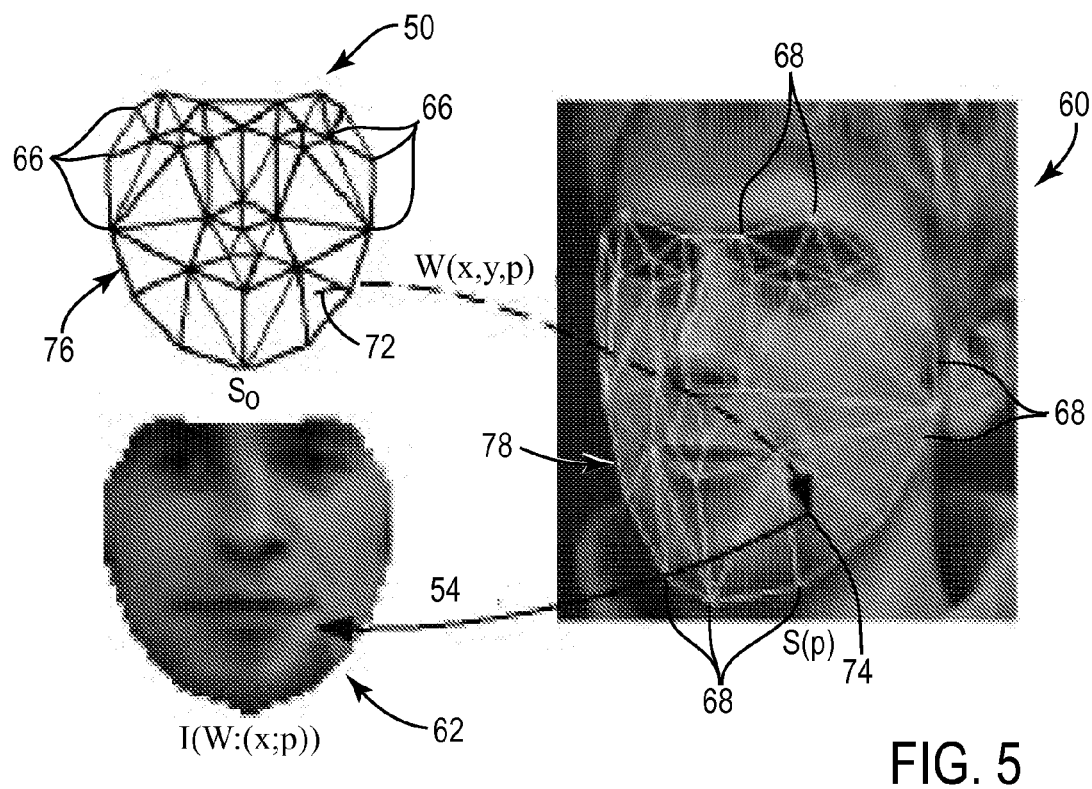
FIG. 5 is an exemplary observation image and a face image warped utilizing the mean shape template in accordance with embodiments of the present disclosure.

An exemplary shape model is illustrated in FIGS. 4 and 5. FIG. 4 illustrates a mean shape 50 and eight shape bases 52-59 for a point distribution model (PDM), while FIG. 5 illustrates an exemplary facial image or observation image 60 and a warped facial image 62 which has been warped from the observation image 60 to the mean shape 50. The shape bases 52-59 are represented by translation vectors 64 through landmark locations 66 in the mean shape 50. The PDM is trained with a representative set of facial images 60. Given a face database, each facial image 60 may be labeled with a set of two-dimensional landmarks 68 represented by coordinates $[u_i, v_i]$, where $i=1, 2, \ldots, v$. The collection of landmarks 68 of one image 60 is treated as one observation set from the random process defined by the shape model $s=[u_1, v_1, u_2, v_2 \ldots, u_v, v_v]^T$. Eigen-analysis may be applied to the observation set, and the resultant model represents a shape defined by the following equation:

$$s(p) = s_0 + \sum_{i=1}^{n} p_i s_i, \tag{1}$$

where $s_0$ is the mean shape 50, $s_i$ is the $i^{th}$ shape basis (e.g., bases 52-59, etc.), and $p=[p_1, p_2, \ldots, p_n]^T$ are the shape parameters. By design, the first four shape bases 52-55 represent global translation and rotation. Together with the other bases 56-59, and any number of additional bases, a warping function from the model coordinate system (i.e., the mean shape 50) to the coordinates in the image observation 60 may be defined as W(u,v;p), where (u,v) is a pixel coordinate within the face region defined by the mean shape 50.

FIG. 5 shows an example of the warping process. That is, given a pixel 72 having coordinates (u,v) in the mean shape 50, the function W(u,v;p) indicates a corresponding pixel 74 in the image observation 60. The warping function may be defined by a piecewise affine warp according to the following equation:

$$W(u,v;p) = [1 \, uv] a(p), \quad (2)$$

where $a(p) = [a_1(p) a_2(p)]$ is a 3×2 affine transformation matrix that is unique to each triangle pair between $s_0$ and $s(p)$ (e.g., a triangle 76 defined by three of the landmarks 66 in the mean shape 50 and a corresponding triangle 78 defined by three of the landmarks 68 in the observation image 60). Given shape parameters p, the a(p) matrix may be computed for each triangle pair 76, 78. Because it may be possible to pre-compute to which triangle 76 each pixel 72 belongs, the warp may be performed via a table lookup, an inner product as in Equation 2, and a bilinear interpolation of the intensity of the corresponding pixel 74 in the image observation 60. The resultant warped image 62 may be denoted as an N-dimensional vector I(W(u;p)), where u is the set of all pixel coordinates within so (i.e., the mean shape 50).

Turning now to FIGS. 6-11, the boosted appearance model is illustrated using an exemplary warped image 100. The warped image 100 may be obtained via the PDM, as described above, or may be the result of any suitable shape model (e.g., ASM, etc.). Boosting-based learning iteratively selects weak classifiers to form a strong classifier using the following equation:

$$F(x) = \sum_{m=1}^{M} f_m(x), \quad (3)$$

where F(x) is the strong classifier and $f_m(x)$ are the weak classifiers. Different variants of boosting are available (e.g., GentleBoost, AdaBoost, etc.). The presently disclosed technique employs the GentleBoost algorithm; however, other boosting algorithms may be utilized. The weak classifier in the GentleBoost algorithm is a soft classifier with continuous output, enabling smoother output of the strong classifier, which in turn is a favorable alignment metric. In addition, for object detection tasks, the GentleBoost algorithm is robust to noisy data and resistant to outliers.

The GentleBoost algorithm may use as input training data denoted as $\{x_i; i=1, 2, \ldots, K\}$ and corresponding class labels denoted as $\{y_i; i=1, 2, \ldots, K\}$. The class labels $y_i$ may be, for example, 1 for positive class data (e.g., images 28 warped with ground truth landmarks (FIG. 2)) and −1 for negative class data (e.g., images 30 warped with perturbed landmarks (FIG. 2)). The GentleBoost framework may be employed to train a classifier that can distinguish correct alignment from incorrect alignment. Given a face database with labeled landmarks s, the ground truth shape parameters p for each face image I may be computed based on Equation 1. Then, the set of warped images I(W(u;p) are treated as positive samples (e.g., $y_i=1$) for the boosting. For each image, a number of negative samples (e.g., $y_i=-1$) are synthesized by randomly perturbing each element of p up to ±μ, where μ is the corresponding eigenvalue of the shape basis in the PDM. Note that in this context a training sample $x_i$ for boosting is a warped image I(W(u;p).

Figure 6:
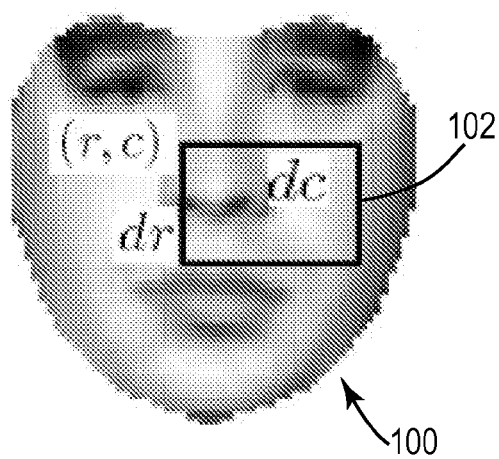
FIG. 6 is an exemplary warped face image in accordance with embodiments of the present disclosure.
Figure 7:
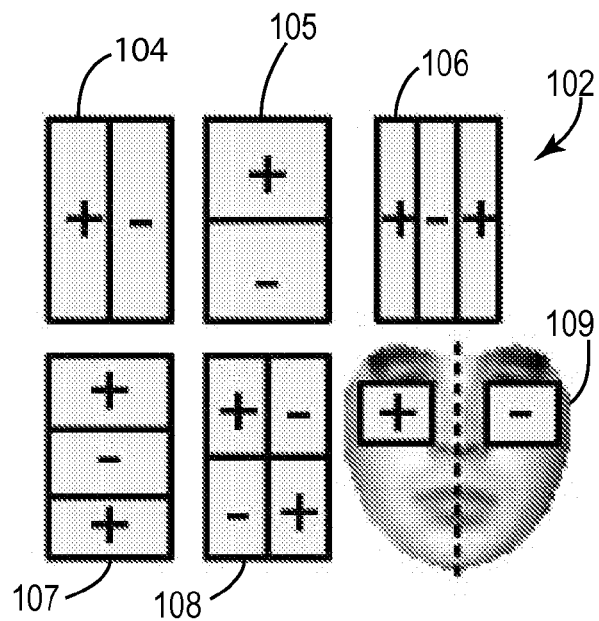
FIG. 7 illustrates exemplary rectangular features in accordance with embodiments of the present disclosure.

An output of the GentleBoost algorithm is a strong classifier F(x), which may be used as the distance metric in the facial alignment process, as described below. In the GentleBoost algorithm, weights and the strong classifier may be initialized such that $w_i=1/K$ and F(x)=0. Then, for m=1, 2, ..., M, the regression function $f_m(x)$ may be fitted by least-squares analysis of $y_i$ to $x_i$ with weights $w_i$ according to the following equation:

$$f_m(x) = \underset{f \in \mathcal{F}}{\text{argmin}} \epsilon(f) = \sum_{i=1}^{K} w_i (y_i - f(x_i))^2, \quad (4)$$

where $\mathcal{F}$ is the hypothesis space. The weak classifier $f_m(x)$ may be constructed based on Haar-like rectangular features 102, as illustrated in FIG. 6. Fast evaluation of the Haar-like features 102 is enabled by the integral image. The rectangular feature 102 may be parameterized by (r,c,dr,dc,b), where (r,c) is the top-left corner, (dr,dc) is the height and width, and b is the feature type. FIG. 7 illustrates exemplary feature types 104-109 which may be used in the present algorithm. One feature type 109 may include two detached rectangles occupying the mirror-position of two sides of the face, based on the assumption that the warped face is approximately symmetric in the horizontal direction. The hypothesis space $\mathcal{F}$ where (r,c,dr,dc,b) resides may be obtained via an exhaustive construction within the mean shape. For example, there may be more than 300,000 such rectangular features for a mean shape with a size of 30×30. Equation 4 in the GentleBoost algorithm selects a weak classifier with minimal error $\epsilon(f)$ from the hypothesis space $\mathcal{F}$ using exhaustive search.

Figure 8:
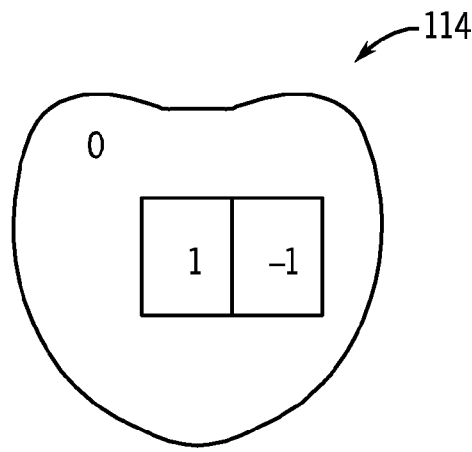
FIG. 8 is an exemplary feature template in accordance with embodiments of the present disclosure.
Figure 9:
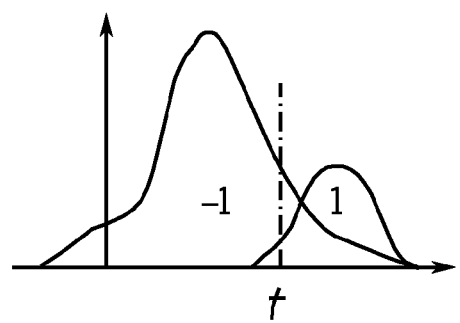
FIG. 9 is a graph of the distribution of the positive and negative samples in the exemplary feature template of FIG. 8 in accordance with embodiments of the present disclosure.

The weak classifier may be defined according to the following equation:

$$f_m(p) = \frac{2}{\pi} \arctan(g_m A_m^T I(W(u; p)) - t_m), \quad (5)$$

where $A_m$ is a template, $g_m$ is ±1, and $t_m$ is a threshold. Given the rectangular feature 102 illustrated in FIG. 7 and denoted by (r,c,dr,dc,b), a corresponding template 114 (i.e., template A) may be generated, as illustrated in FIG. 8. The inner product between the template 114 (i.e., A) and the warped image 100 (i.e., I(W(x;p)) is equivalent to computing the rectangular feature using the integral image. Once the rectangular features for a set of training samples are computed, $g_m=-1$ if the mean of the features of positive samples is less than that of the negative samples, otherwise $g_m=1$. The threshold, $t_m$, may be obtained through binary search along the span of the rectangular features 102, such that the weighted LSE is minimal, as illustrated in FIG. 9. Due to the arctan( ) function, the classifier response $f_m(p)$ is continuous within −1 and 1.

After the regression function $f_m(x)$ has been fit by weighted least-squares analysis of $y_i$ to $x_i$, the strong classifier may be updated according to the following equation:

$$F(x) = F(x) + f_m(x) \quad (6)$$

In addition to updating the strong classifier, the weights $w_i$ are updated and normalized according to the following equations:

$$w_i = w_i e^{-y_i f_m(x_i)}, \text{ and} \quad (7)$$

$$\sum_{i=1}^{K} w_i = 1. \quad (8)$$

The regression function $f_m(x)$ is iteratively updated in this manner until the strong classifier score $F(x)$ is maximized, at which point the classifier score is output according to the following equation:

$$\text{sign}[F(x)] = \text{sign}\left[\sum_{m=1}^{M} f_m(x)\right]. \quad (9)$$

Figure 11:
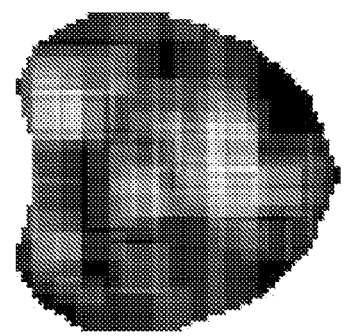
FIG. 11 illustrates the spatial distribution of exemplary rectangular features from a face dataset in accordance with embodiments of the present disclosure.
Figure 10:
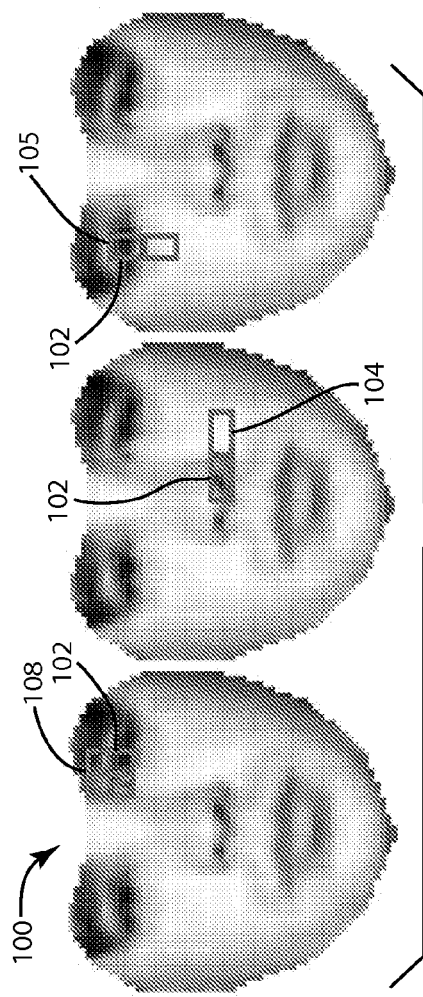
FIG. 10 illustrates the exemplary rectangular features of FIG. 7 applied to the exemplary warped face image of FIG. 6 in accordance with embodiments of the present disclosure.

The results of the boosting are a number of weak classifiers, each with seven parameters, denoted as $c_m=(r,c,dr,dc,b,g,t)$. The set of weak classifiers (i.e., $\{c_m; m=1, 2, \ldots, M\}$) is the BAM. FIG. 10 shows an exemplary top three rectangular features 102 (e.g., features 108, 104, and 105 (FIG. 7)), and FIG. 11 illustrates the spatial distribution of an exemplary top 50 features trained from a face dataset with 400 images.

In summary, the appearance model may be trained utilizing the following steps:
 1. acquire training images;
 2. label 2D landmarks (e.g., 33 facial landmarks) for each training image;
 3. determine the ground truth shape parameters for each training image (e.g., using Equation 1);
 4. generate positive image samples by warping each image with the ground truth shape parameters;
 5. generate negative image samples by warping each image with perturbed shape parameters;
 6. input the positive and negative image samples, with their corresponding labels, into a boosting algorithm (e.g., Equations 4-9); and
 7. determine and store the parameters of the weak classifiers (e.g., $c_m$) as the BAM.

The discriminative model-based BAM has a number of advantages over the traditional generative model-based AAM. For example, the BAM learns from not only the appearance of correct alignment, but also the appearance of incorrect alignment. In addition, because of the local rectangular features, the BAM is inherently more likely to be robust to partial occlusion. Furthermore, the BAM is a much more storage-efficient way of modeling appearance information than the AAM. Training data is not stored in the BAM; rather, the knowledge of the training data is absorbed in the selected rectangular features. Hence, the BAM only saves a 7×M matrix as the model, where M is the number of weak classifiers defined. In contrast, the AAM utilizes an N×Q matrix, where the $I(W(u;p))$ vector is N-dimensional, Q is the number of appearance bases, N is much greater than M, and Q is greater than 7. This increased storage efficiency potentially enables model-based face alignment from mobile devices (e.g., cell phones, personal digital assistants, etc.).

Face Alignment

Given the trained shape and appearance models, such as the PDM and BAM described above, face alignment may be performed by finding the shape parameters p which maximize the score of the strong classifier, according to the following equation:

$$\max_{p} \sum_{m=1}^{M} f_m(p). \quad (10)$$

That is, given the initial shape parameters $p^{(0)}$, new shape parameters are determined that result in the warped image (i.e., $I(W(u;p))$) with the maximal score from the strong classifier. Because image warping is involved in the objective function, this is a nonlinear optimization problem. Accordingly, the gradient ascent method may be employed to solve this problem iteratively.

Substituting Equation 5 into Equation 10, the function to be maximized is as follows:

$$F(p) = \sum_{m=1}^{M} \frac{2}{\pi} \arctan(g_m A_m^T I(W(u; p)) - t_m). \quad (11)$$

Taking the derivate of Equation 11 with respect to p gives the following equation:

$$\frac{dF}{dp} = \frac{2}{\pi} \sum_{m=1}^{M} \frac{g_m \left[\nabla I \frac{dW}{dp}\right]^T A_m}{1 + [g_m A_m^T I(W(u; p)) - t_m]^2}, \quad (12)$$

where $\nabla I$ is the gradient of the image I evaluated at $W(u;p)$, and $$\frac{dW}{dp}$$

is the Jacobian of the warp evaluated at p.

The derivative $$\frac{dF}{dp}$$

indicates the direction to modify p such that the classification score (i.e., the strong classifier $F(p)$) increases. Thus, during the alignment iteration, the shape parameters p may be updated via the following equation:

$$p = p + \lambda \frac{dF}{dp}, \quad (13)$$

where $\lambda$ is the step size. This iteration may continue until the change of the facial landmark locations is less than a threshold denoted by $\tau$. The derivative $$\frac{dF}{dp}$$

may be calculated based on Equation 2 and the chain rule, which results in the following equation:

$$\frac{dW}{dp} = \left[\frac{dW}{da_1}\frac{da_1}{dp} \quad \frac{dW}{da_2}\frac{da_2}{dp}\right], \quad (14)$$

where $$\frac{dW}{da_1} \text{ and } \frac{dW}{da_2}$$

are both N×3 matrices, and N is the number of pixels in the warped images. Since the affine parameter a is a linear function of p, $$\frac{da_1}{dp} \text{ and } \frac{da_2}{dp}$$

are independent of p, and therefore $$\frac{dW}{dp}$$

does not depend on p. That is, $$\frac{dW}{dp}$$

may be pre-computed and does not need to be updated in each alignment iteration. It should be noted that this computational gain is available due to use of the piecewise affine warp, which is linear on p. In other embodiments, such as when the warp is a polynomial on p, $$\frac{dW}{dp}$$

may be re-elevated when p is updated.

A steepest descent image may be denoted by the following equation:

$$SD = \nabla I \frac{dW}{dp}. \tag{15}$$

The SD may be an N×n matrix, where n is the number of shape bases and N is defined as described above. Similar to $A_m^T I(W(u;p))$, the matrix multiplication may be substituted by computation of the integral images of each column in SD and calculation of the rectangular features of $A_m$ by a fast lookup table.

Input to the alignment algorithm may include the input image I, the initial shape parameters p, the PDM $\{s_i; i=1, 2, \ldots, n\}$, the BAM $\{c_m; m=1, 2, \ldots, M\}$, and the pre-computed Jacobian $$\frac{dW}{dp}.$$

After computing the two-dimensional gradient of the image I, calculation of the shape parameters p having the maximized classifier score may be performed using the following alignment algorithm:

1. warp I with W(u;p) to compute I(W(u;p));
2. compute the feature for each weak classifier according to the following equation:

$$e_m = g_m A_m^T I(W(u;p)) - t_m; \ m=1,2,\ldots,M; \tag{16}$$

3. bilinearly interpolate the gradient of image I at W(u;p);
4. compute the SD in accordance with Equation 15;
5. compute the integral images for each column of SD and obtain the rectangular features for each classifier according to the following equation:

$$b_m = g_m SD^T A_m; \ m=1,2,\ldots,M, \tag{17}$$

where $b_m$ is the gradient direction derived from each weak classifier;

6. compute Δp using the following equation:

$$\Delta p = \lambda \frac{2}{\pi} \sum_{m=1}^{M} \frac{b_m}{1+e_m^2}; \text{ and} \tag{18}$$

7. update p=p+Δp.

Steps 1-7 may be repeated until the following condition is met:

$$\left\| \sum_{i=1}^{n} \Delta p_i s_i \right\| \leq \tau. \tag{19}$$

It should be noted that weak classifiers with low $|e_m|$ are less certain in their classification decision, and accordingly these classifiers contribute more to the travel direction.

Table 1 summarizes the computation cost for each step of the alignment algorithm during one iteration. Note that due to the use of integral images, the most computationally intensive step, Step 5, may be computed in a relatively efficient manner.

TABLE 1

| Step | Cost |
|---|---|
| 1 | O(nN) |
| 2 | O(N + M) |
| 3 | O(N) |
| 4 | O(nN) |
| 5 | O(n(N + M)) |
| 6 | O(nM) |
| 7 | O(N) |
| Total | O(n(N + M)) |

Experimental Results

The face alignment algorithm described above may be employed to align a template to an image. In some instances, the image may be an image which was not included in the training data, and in other cases the image may be altered and/or partially occluded. To evaluate the presently-disclosed alignment algorithm, 968 images are collected from multiple publicly available databases, including the ND1 Database, the Facial Recognition Technology (FERET) Database, and the Informatics and Mathematical Modelling (IMM) Database. Table 2 summarizes the images utilized from each database and groups the images into three sets, where:

1. set 1 includes 400 images (i.e., one image per subject) from two databases and is used as the training set for the PDM and BAM;
2. set 2 includes 334 different images from some of the subjects present in Set 1 (i.e., the 200 subjects from the ND1 database); and 3. set 3 includes 234 images from 40 subjects in the IMM database that were never used in the training.

Figure 14:
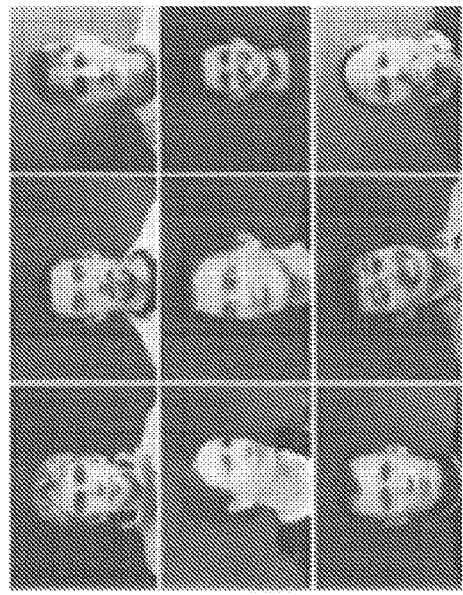
FIGS. 12-14 are exemplary images from three datasets in accordance with embodiments of the present disclosure.
Figure 13:
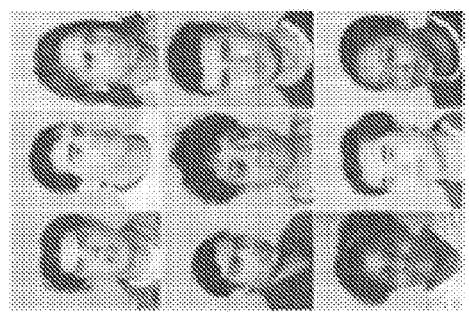
Figure 12:
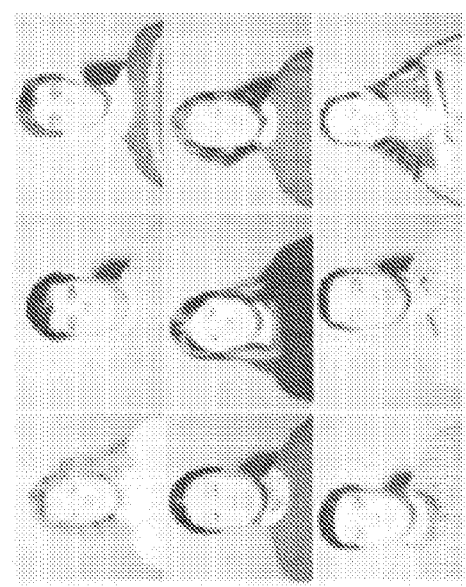

This partition ensures that two levels of generalization are tested (i.e., set 2 is tested as the unseen data of seen subjects, and set 3 is tested as the unseen data of unseen subjects). In this exemplary embodiment, there are 33 manually labeled landmarks for each image. To speed up the training process, the image set is down-sampled such that the facial width is roughly 40 pixels across the set. Exemplary images from each of datasets 1-3 are shown in FIGS. 12-14, respectively.

TABLE 2

| Database | ND1 | FERET | IMM |
| --- | --- | --- | --- |
| Images | 534 | 200 | 234 |
| Subjects | 200 | 200 | 40 |
| Variations | Frontal View | Pose | Pose, Expression |
| Set 1 | 200 | 200 | |
| Set 2 | 334 | | |
| Set 3 | | | 234 |

Given a dataset with ground truth landmarks, the experimental procedure consists of running the alignment algorithm on each image with a number of initial landmarks and statistically evaluating the alignment results. The initial landmarks are generated by randomly perturbing the ground truth landmarks by an independent Gaussian distribution whose variances are equal to a multiple (sigma) of the eigenvalue of the shape basis during PDM training. The alignment is considered to converge if the resultant root mean square error (RMSE) between the aligned landmarks and the ground truth is less than 1.0 pixel after the algorithm terminates. Two metrics are used to evaluate the alignment results for the converged trials. One is the average frequency of convergence (AFC), which is the number of trials where the alignment converges divided by the total number of trials. The other is the histogram of the resultant RMSE (HRMSE) of the converged trials, which measures how close the aligned landmarks are with respect to the ground truth. These two metrics measure the robustness and accuracy of alignment, respectively.

The presently disclosed alignment algorithm is compared to the simultaneous inverse compositional (SIC) algorithm, which has been shown to perform best among the family of AAM-based methods. Both algorithms are tested under the same conditions. For example, both algorithms are initialized with the same set of randomly perturbed landmarks. In addition, both algorithms have the same termination condition (e.g., the number of iterations is larger than 55 or the RMSE is less than 0.025 pixels). Furthermore, the HRMSE is only computed on the trials where both algorithms converge.

The PDM and BAM are trained using set 1. For each image, 10 negative samples are generated. Accordingly, there are 400 positive and 4000 negative samples used in the boosting-based learning. The resultant exemplary PDM has 33 shape bases, and the exemplary BAM has 50 weak classifiers. The number of weak classifiers is determined by whether the current set of weak classifiers can generate less than 0.1% false alarm rate at 0% missed detection rate on the training set. In contrast, the SIC uses the same PDM model and an appearance model with 24 appearance bases. The number of appearance bases is chosen such that 99% of the energy is retained in the appearance model for the training set.

Figure 15:
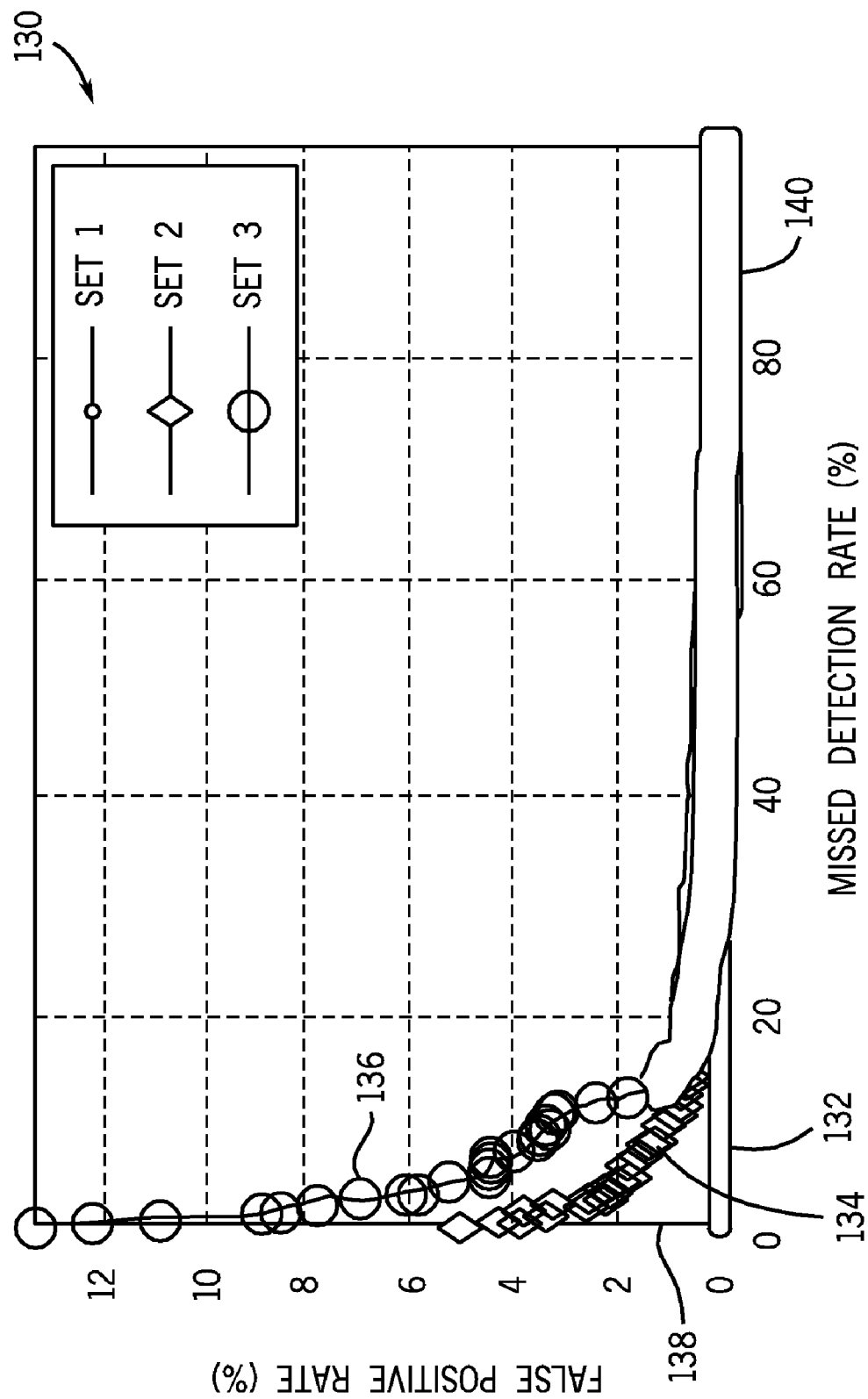
FIG. 15 is a graph illustrating performance curves for the three datasets illustrated in FIGS. 12-14 in accordance with embodiments of the present disclosure.

To test the generalization capability of the trained BAM, the classification is performed on all three datasets 1, 2, and 3. For set 2, 334 positive samples are obtained by warping images using the ground truth landmarks, and 3,340 negative samples are obtained by perturbing each ground truth landmark 10 times, using the same methodology as for set 1. Similarly, 234 positive and 2,340 negative samples are generated from set 3. FIG. 15 is a graph 130 illustrating performance curves 132, 134, and 136 for the three datasets 1, 2, and 3, respectively. The curves 132, 134, 136 compare the false positive rate (e.g., y-axis 138) to the missed detection rate (e.g., x-axis 140) and may be obtained by setting different thresholds for the classification score F(p). While the performances on sets 2 and 3 (i.e., curves 134 and 136) are worse than that of set 1 (i.e., curve 132), as expected, the BAM still achieves reasonable classification capability on the unseen data, enabling use of the BAM in the alignment optimization.

Figure 16:
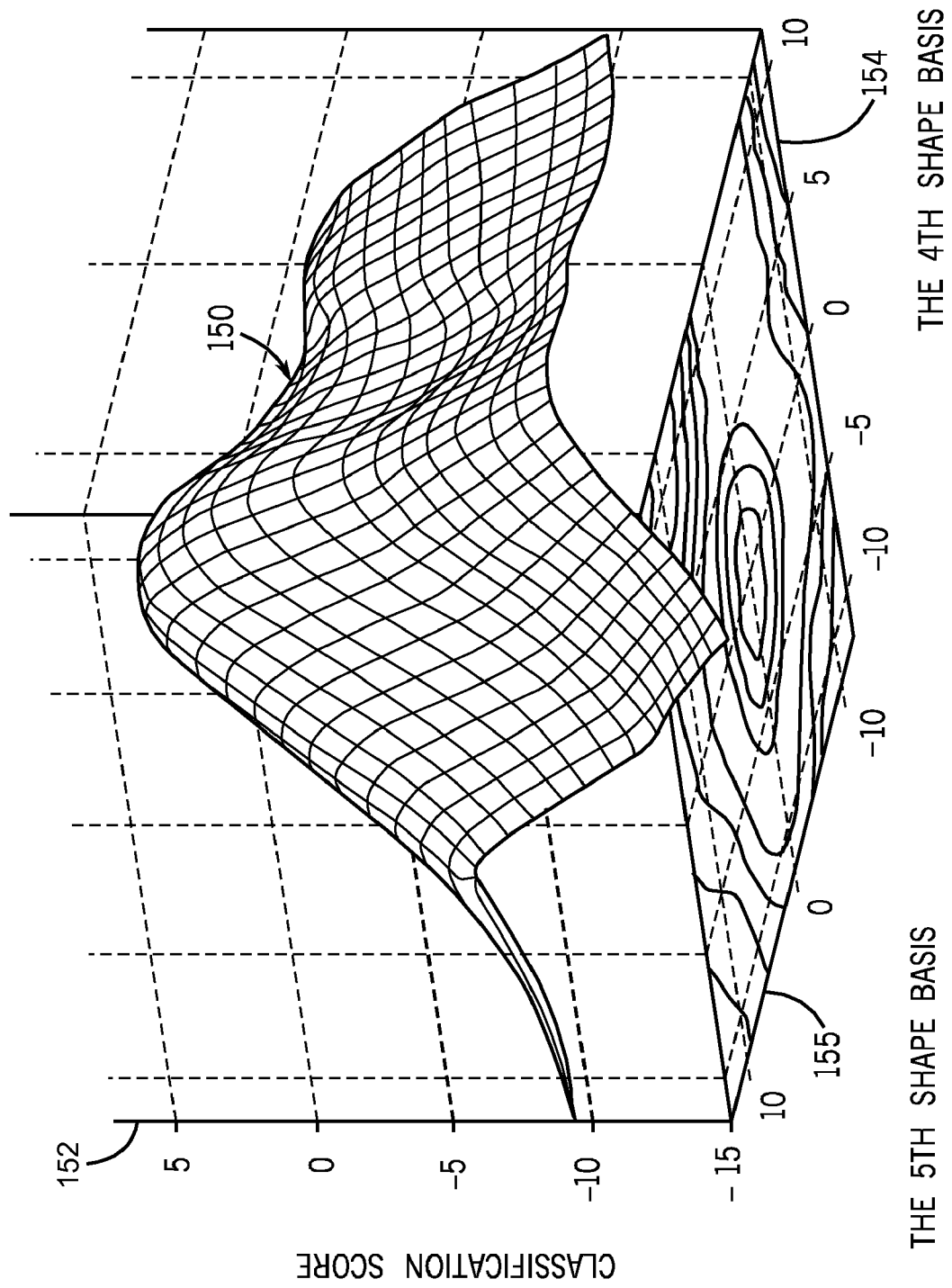
FIG. 16 is a graph illustrating how perturbation of two of the shape bases illustrated in FIG. 4 may change the classification score in accordance with embodiments of the present disclosure.
Figure 17:
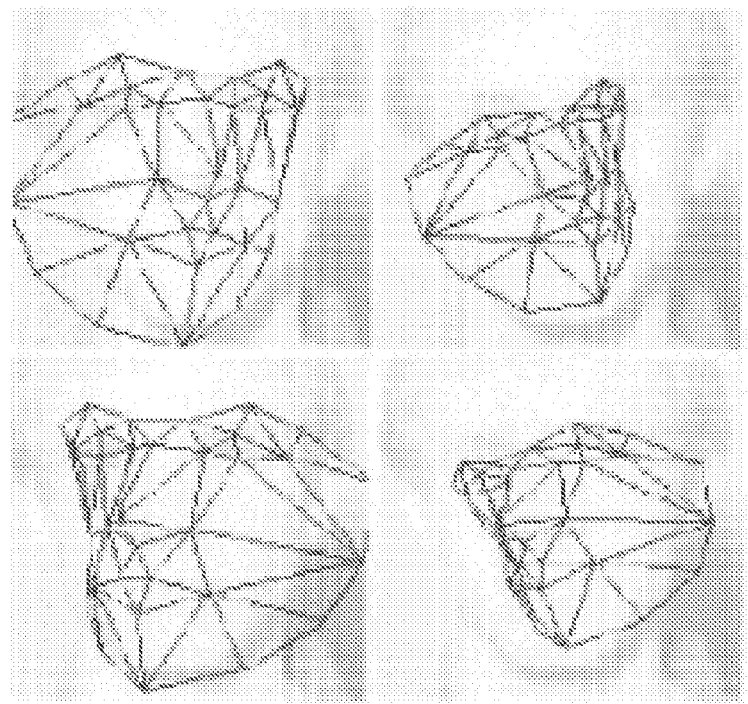
FIG. 17 illustrates the perturbed facial landmarks when the perturbation is at the four corners of the graph illustrated in FIG. 16 in accordance with embodiments of the present disclosure.

FIG. 16 illustrates that for a given image, a convex surface 150 of classification scores (e.g., z-axis 152) may be observed while perturbing the shape parameters along two shape bases (e.g., x-axis 154 and y-axis 156) and setting the shape parameters at other bases to be zero. The gradient ascent algorithm may perform well on this type of surface 150 due to its convex shape. The range of the perturbation equals 1.6 times the eigenvalue of these two bases. When the perturbation is at the maximal amount for the two bases (e.g., at the four corners on the surface 150), the corresponding four perturbed landmarks are shown in FIG. 17. In the described experiments, when the sigma equals 1.6, the actual initial landmarks may be further away from the ground truth compared to these four examples because all bases are allowed to be perturbed.

Figure 18:
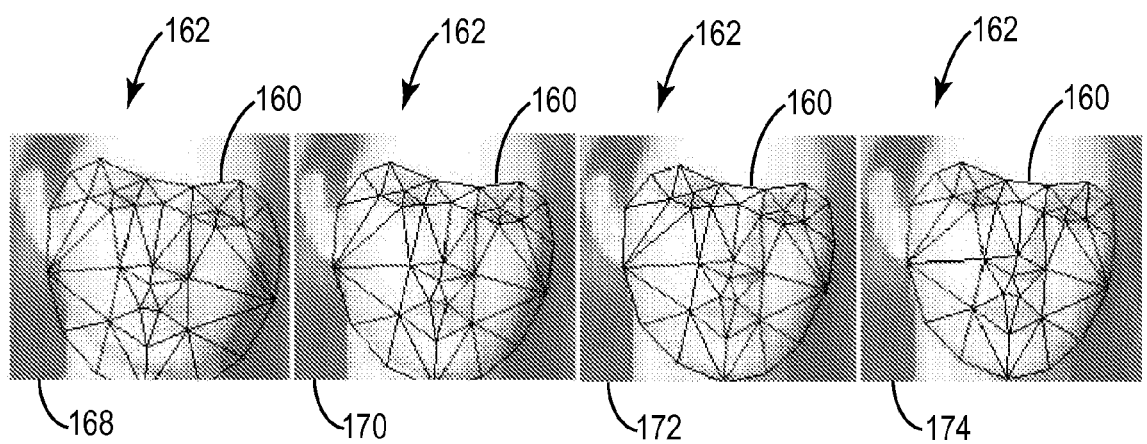
FIG. 18 illustrates iterative alignment of a template with a face image in accordance with embodiments of the present disclosure.
Figure 19:
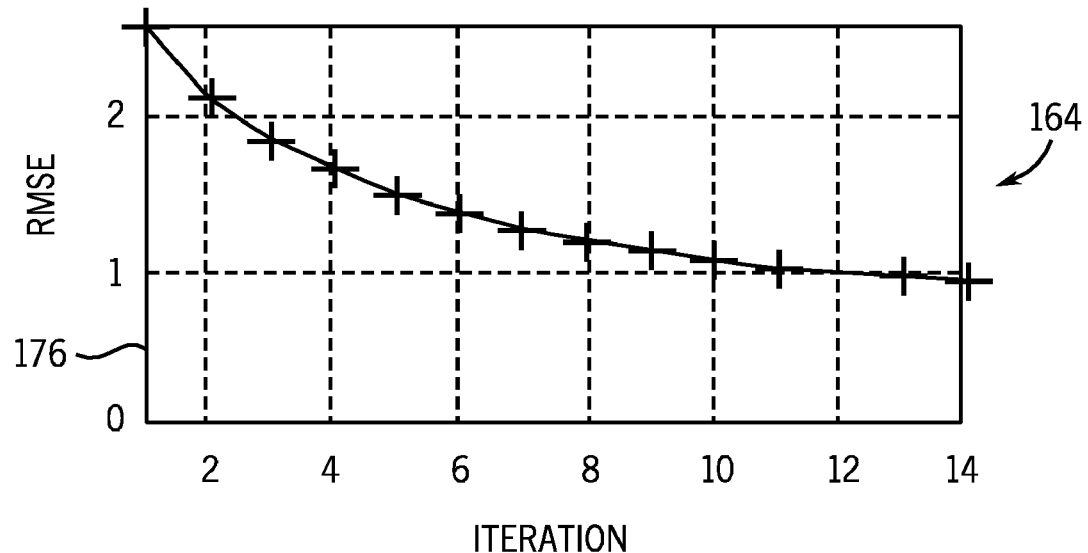
FIG. 19 is a graph of the root mean square error of successive iterations in accordance with embodiments of the present disclosure.
Figure 20:
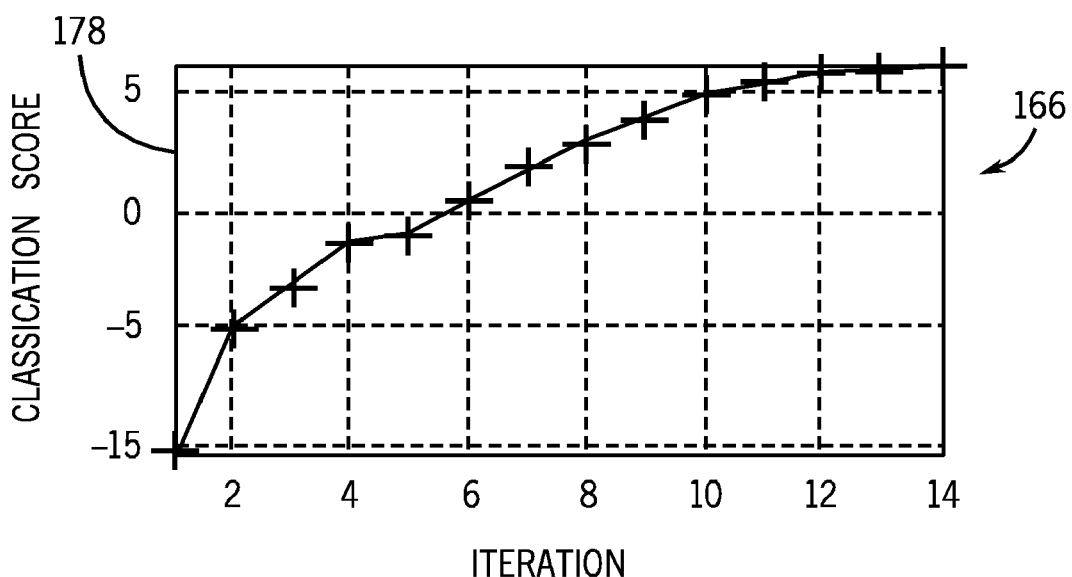
FIG. 20 is a graph of the classification score of successive iterations in accordance with embodiments of the present disclosure.

FIGS. 18-20 illustrate an example of iterative boosting-based face alignment. FIG. 18 shows a template 160 aligned to an image 162 at different iterations. FIGS. 19 and 20 are graphs 164 and 166, respectively, illustrating changes in the RMSE and the classification score, respectively, for successive iterations. Given the initial landmarks, as shown in a first iteration 168, the alignment iteratively updates the facial landmarks (e.g., in iterations 170, 172, and 174). With each iteration, the RMSE (e.g., y-axis 176) decreases with respect to the ground truth, as illustrated in FIG. 19, and the classification score (e.g., y-axis 178) increases for the warped image, as illustrated in FIG. 20. Note that computation of the score is for illustration purposes and is not a necessary step during the alignment iteration. However, the score after the alignment convergence can serve as an indication of the quality of the image alignment. This score may be quickly computed via the following equation, obtained by substituting Equation 16 into Equation 11:

$$F(p) = \frac{2}{\pi} \sum_{m=1}^{M} \arctan(e_m). \tag{20}$$

Figure 21:
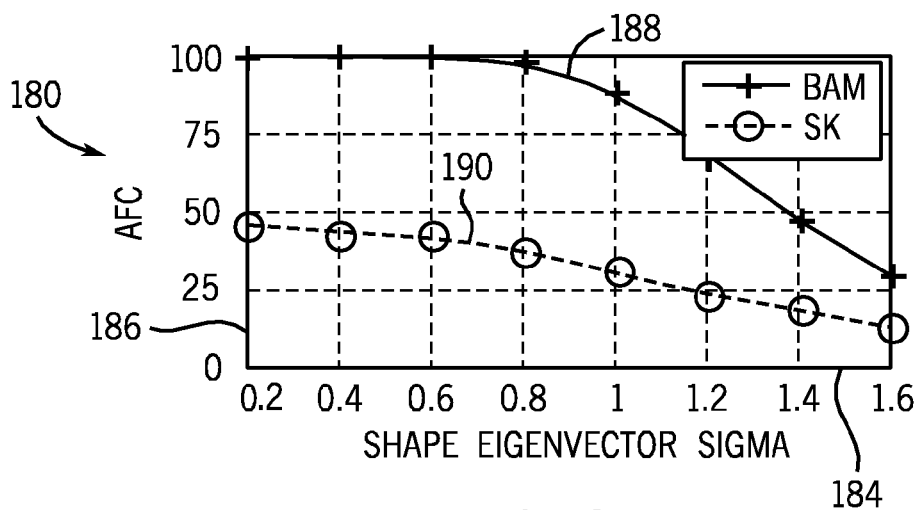
FIG. 21 is a graph illustrating the robustness of the face alignment models as tested on the image dataset illustrated in FIG. 12 in accordance with embodiments of the present disclosure.
Figure 22:
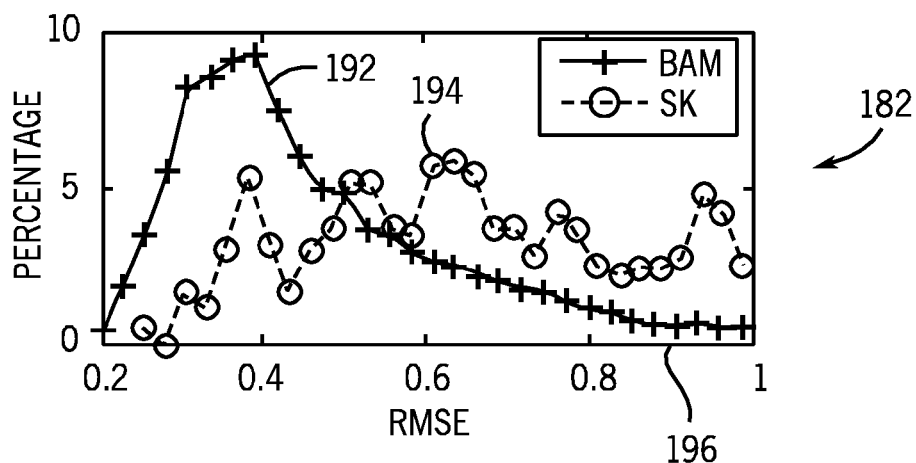
FIG. 22 is a graph illustrating the accuracy of the face alignment models as tested on the image dataset illustrated in FIG. 12 in accordance with embodiments of the present disclosure.
Figure 23:
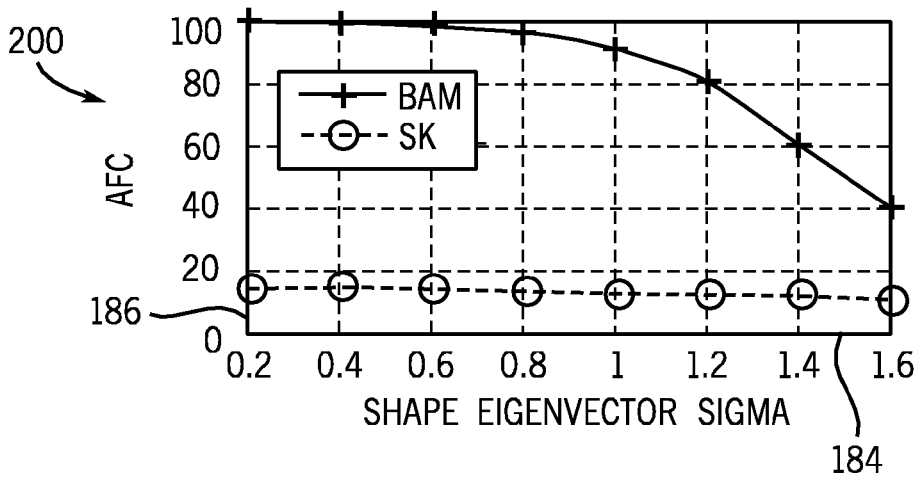
FIG. 23 is a graph illustrating the robustness of the face alignment models as tested on the image dataset illustrated in FIG. 13 in accordance with embodiments of the present disclosure.
Figure 24:
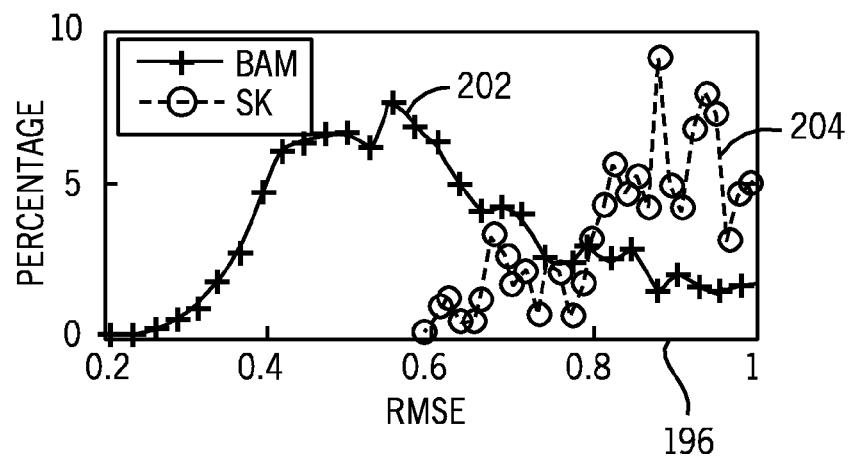
FIG. 24 is a graph illustrating the accuracy of the face alignment models as tested on the image dataset illustrated in FIG. 13 in accordance with embodiments of the present disclosure.
Figure 25:
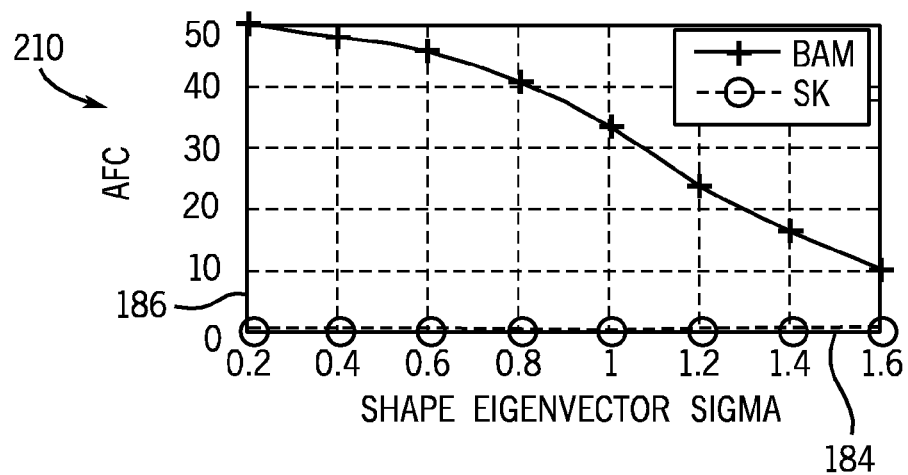
FIG. 25 is a graph illustrating the robustness of the face alignment models as tested on the image dataset illustrated in FIG. 14 in accordance with embodiments of the present disclosure.
Figure 26:
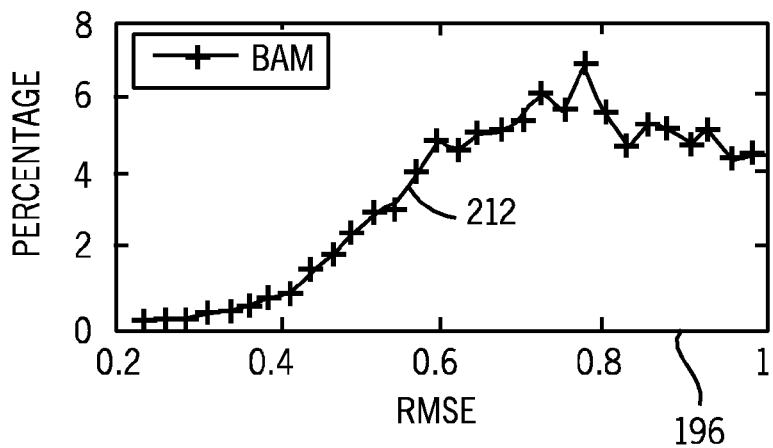
FIG. 26 is a graph illustrating the accuracy of the face alignment models as tested on the image dataset illustrated in FIG. 14 in accordance with embodiments of the present disclosure.

The face alignment algorithms are first tested on set 1. The results are summarized in graphs 180 and 182 illustrated in FIGS. 21 and 22, respectfully. The graph 180 charts the robustness of the two face alignment algorithms. The shape eigenvector sigma value (e.g., x-axis 184) indicates the amount of perturbation of the initial landmarks and is plotted against the average frequency of convergence (e.g., y-axis 186). Given one sigma value, 2,000 trials are randomly generated, where each one of 400 images has five random initializations. It can be seen that the BAM algorithm (e.g., plot 188) has a consistently higher AFC (e.g., the y-axis 186 value) than the SIC algorithm (e.g., plot 190). Each sample in FIG. 21 is averaged based on these 2,000 trials. For the trials where both algorithms converge, histograms 192 (e.g., for the BAM algorithm) and 194 (e.g., for the SIC algorithm) of the converged RMSE (e.g., x-axis 196) are plotted in FIG. 22. The same experiments are performed for sets 2 and 3 with 2,004 and 2,106 trials, respectively, using the same PDM and BAM as that of set 1. The results are illustrated in FIGS. 23-26. That is, FIG. 23 is a chart 200 illustrating the AFC (e.g., the y-axis 186) versus the eigenvector sigma value (e.g., the x-axis 184) for set 2, and FIG. 24 illustrates histograms 202 (e.g., for the BAM algorithm) and 204 (e.g., for the SIC algorithm) of the converged RMSE (e.g., x-axis 196). Similarly, FIG. 25 is a chart 210 illustrating the AFC (e.g., the y-axis 186) versus the eigenvector sigma value (e.g., the x-axis 184) for set 3, and FIG. 26 illustrates a histogram 212 of the converged RMSE (e.g., x-axis 196) for the BAM algorithm. FIG. 26 does not illustrate the HRMSE for the SIC algorithm because there is no convergence, as illustrated in FIG. 25. The step size λ (Equations 13 and 18) is manually set to be the same constant for all experiments.

A number of observations may be made from this first experiment. First, boosting-based alignment performs substantially better than the SIC algorithm, both in terms of alignment robustness (AFC) and accuracy (HRMSE). Second, although both algorithms have worse performance when fitting to unseen images, the BAM has a lower relative performance drop compared to the SIC. For example, for the BAM tests on unseen data of seen subjects (e.g., set 2, illustrated in FIG. 23), the AFC is almost the same as the test on the training subjects (e.g., set 1, illustrated in FIG. 21).

Figure 27:
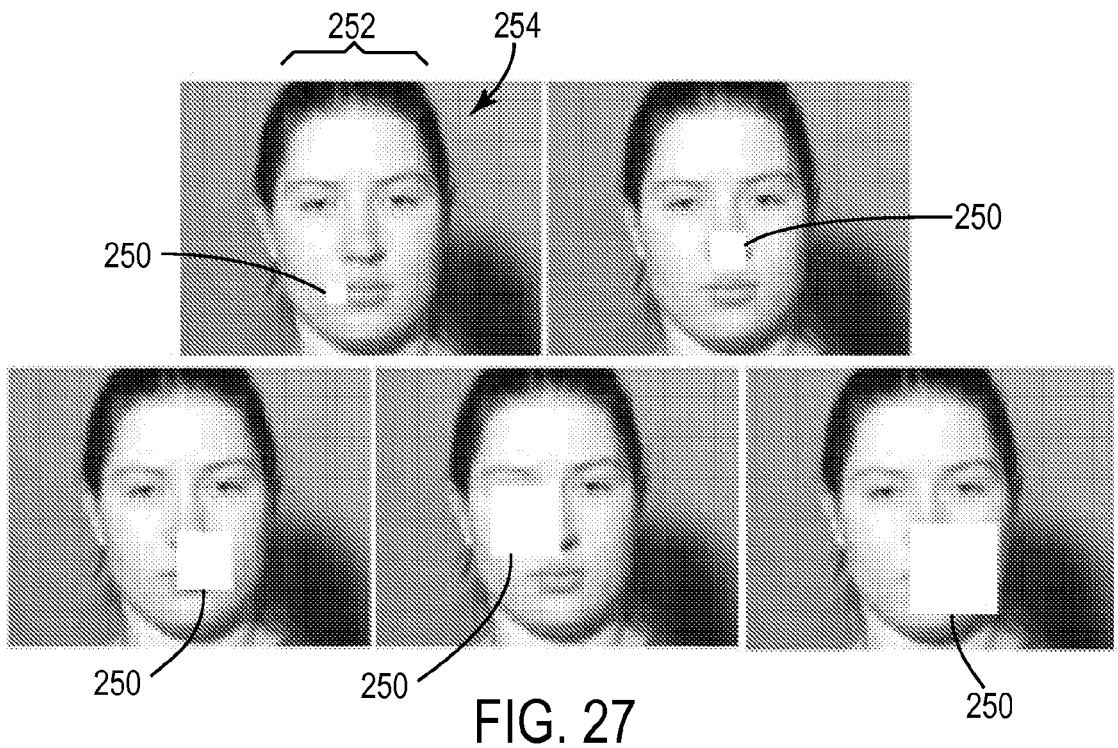
FIG. 27 illustrates partially occluded face images in accordance with embodiments of the present disclosure.
Figure 28:
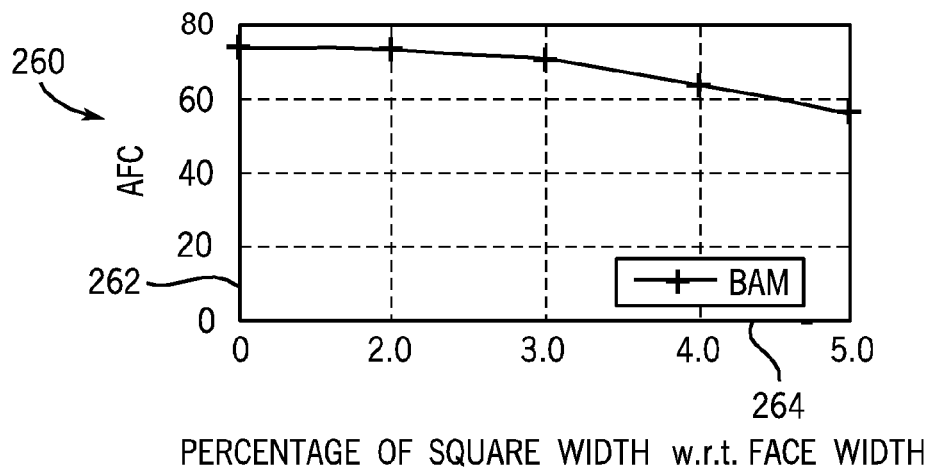
FIG. 28 is a graph of the average frequency of convergence versus a percentage of the occluded width of the face in accordance with embodiments of the present disclosure.

A strength of using the rectangular features 102 (FIG. 6) is that they are localized features and are therefore inherently likely to be robust to partial occlusion. A second experiment is conducted to illustrate this quality. As illustrated in FIG. 27, a white square 250 whose size is a certain percentage of a facial width 252 is generated and randomly placed on a tested face area 254. The initial landmarks are perturbed in the usual way by fixing the sigma of the shape bases to be 1.0. In the present experiment, five levels of occlusion are tested on set 2, as illustrated in FIG. 27. FIG. 28 is a graph 260 charting AFC (e.g., y-axis 262) versus a percentage of the width of the white square 250 with respect to the face width 252 (e.g., x-axis 264). This second experiment demonstrates that the boosting-based alignment can tolerate a certain level of occlusion due to the nature of the features used in the appearance modeling.

Table 3 lists the computation cost of the alignment test on set 2, without occlusion. The number of iterations and times in fitting one image are averaged for the trials where both algorithms converge. It is clear that with different amounts of perturbation, the BAM algorithm performs consistently faster than the SIC algorithm and converges in fewer iterations. The cost is based on a Matlab™ implementation of both algorithms running on a conventional 2.13 GHz Pentium4™ laptop. The BAM algorithm is anticipated to run faster than real-time (e.g., 30 frames per second) with a C++ implementation.

TABLE 3

| Sigma | 0.2 | 0.6 | 1.0 | 1.4 | 1.6 |
|---|---|---|---|---|---|
| BAM iterations | 7.1 | 7.3 | 7.6 | 9.1 | 9.0 |
| SIC iterations | 54.4 | 54.8 | 54.6 | 54.4 | 55.4 |
| BAM time (sec.) | 0.10 | 0.11 | 0.11 | 0.14 | 0.14 |
| SIC time (sec.) | 0.62 | 0.59 | 0.61 | 0.62 | 0.60 |

Applications

Image alignment may be employed in numerous applications. For example, facial recognition may include image alignment. In use, an image acquisition system (e.g., a camera, scanner, video recorder, or the like) may acquire image data of a subject. The image may be aligned using the technique described above. Based on the aligned template, various features of the subject may be quantified. For example, the distance between the subject's eyes, the width of the subject's nose, and the shape of the subject's face may be determined and encoded. The facial recognition system may then compare the subject's unique code to a database of codes derived from known images. The subject may be identified based on how closely the determined code matches a known code.

In another application, image alignment may enable detection of facial expressions. That is, an expression recognition system may be able to identify if a subject is happy, sad, angry, surprised, afraid, etc. By aligning a template to the subject's face, various metrics (e.g., brow position, eye shape, head position, mouth openness, and so forth) may be determined which can be interpreted based on facial expression research.

A further application of the present image alignment technique may include head orientation estimation. That is, by aligning a template to a subject's image, the direction in which the subject's head is turned may be estimated. This technology may be used to analyze interest in a crowd (e.g., by determining how many people are paying attention), target advertising (e.g., by transmitting a message either visually or audibly when the subject's head is turned towards an advertisement), and so forth.

The image alignment technique disclosed herein may also be used to generate higher-resolution images from multiple lower-resolution images. A template may be aligned to multiple images of the same subject. The images may be registered, or aligned to each other, based on the aligned templates. Once the subject's features are aligned in the various images, they may be combined to generate an image of higher resolution than any single image in the set.

Various other applications may utilize the image alignment method in accordance with embodiments of the present technique. For example, image alignment may be employed in face fitting, image coding, tracking, image mosaicing, medical image interpretation, dynamic texturing, industrial inspection, and so forth. It should also be understood that while the present disclosure described image alignment in the context of facial alignment, any object may be aligned using the disclosed techniques.

The disclosed system and method provide a novel discriminative method of appearance modeling via boosting. Unlike the conventional generative model-based AAM that only models the Gaussian distribution of correct alignment, the BAM learns the discriminative properties between correct and incorrect alignment. Also, the BAM is a much more compact representation compared to AAM, since only the weak classifier parameters are stored as the model. Furthermore, the local rectangular features used in the BAM makes it robust to partial occlusion. In addition, the disclosed system and method provide a novel alignment algorithm through maximizing the classification score. Compared to minimizing the MSE in AAM-based approaches, the disclosed method benefits from learning from a large dataset and generalizing well to unseen data. The final classification score after convergence also provides a natural way to describe the quality of the image alignment. Furthermore, the performance of generic face alignment is greatly improved utilizing the presently disclosed techniques. The AAM-based approach performs well for person-specific or small population-based face alignment; however, the present techniques improve face alignment toward the goal of fitting faces from any subject and with any expression in real time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for image alignment, comprising:
    obtaining a positive class of input by warping image data according to ground truth shape parameters;
    obtaining a negative class of input by warping the image data according to perturbed shape parameters; and
    training an appearance model based on the positive and negative classes of input.

2. The method of claim 1, wherein the appearance model comprises a plurality of weak classifiers based on the positive and negative classes of input.

3. The method of claim 2, comprising maximizing a strong classifier based on the weak classifiers to align a template to an image.

4. The method of claim 1, wherein the ground truth shape parameters are determined by a shape model.

5. The method of claim 4, wherein the shape model comprises a weighted linear combination of a plurality of shape bases, and the weights comprise the ground truth shape parameters.

6. The method of claim 1, comprising generating a plurality of negative samples for each positive sample in the positive class of input.

7. A method for image alignment, comprising:
    identifying a plurality of weak classifiers, wherein the weak classifiers comprise rectangular features parameterized by (r, c, dr, dc, b), wherein:
        (r, c) is a corner of the rectangular feature,
        (dr, dc) are the dimensions of the rectangular feature, and
        b denotes a type of rectangular feature; and
    wherein the rectangular features comprise two detached rectangles occupying mirror positions of two halves of the image;
    iteratively updating application of a template to an image by maximizing a strong classifier score, the strong classifier score comprising a combination of the plurality of weak classifiers; and
    wherein the strong classifier score is defined by the equation $$F(p) = \sum_{m=1}^{M} \frac{2}{\pi} \arctan(g_m A_m^T I(W(u; p)) - t_m),$$

wherein:
    p represents shape parameters for an image;
    m represents an iteration number;
    $g_m$ has a value of ±1;
    $A_m^T$ represents a feature template;
    $I(W(u;p))$ represents the image warped to a shape template; and
    $t_m$ represents a threshold.

8. A method, comprising:
    acquiring image data for an image of a person; and
    aligning a template to the image data by maximizing a strong classifier score, wherein the strong classifier score is based on a plurality of weak classifiers defined by positive and negative training images; wherein the positive training images are obtained by warping image data according to ground truth shape parameters, and the negative training images are obtained by warping the image data according to perturbed shape parameters.

9. The method of claim 8, comprising recognizing facial expressions of the person based on the aligned template.

10. The method of claim 8, comprising estimating head orientation of the person based on the aligned template.

11. The method of claim 10, comprising transmitting a message if the estimated head orientation is in a desired direction.

12. The method of claim 8, comprising combining a plurality of images to generate a high-resolution image of the person by registering the image data based on the aligned templates.

13. The method of claim 8, comprising comparing the image data to a database of known image data based on the aligned template.

14. A method for image alignment, comprising:
    training a shape model with a representative set of images;
    training an appearance model based on positive and negative classes of input to determine a plurality of weak classifiers based on the positive and negative classes of input; wherein the positive and negative classes of input are the representative set of images warped based on the shape model; and
    aligning the template to an image by maximizing a strong classifier based on the weak classifiers.

15. The method of claim 14, wherein the positive class of input comprises the representative set of images warped based on ground truth parameters determined from the shape model.

16. The method of claim 14, wherein the negative class of input comprises the representative set of images warped based on parameters perturbed from the ground truth parameters determined from the shape model.

17. The method of claim 14, wherein the strong classifier comprises a summation of the weak classifiers.

18. A method for image alignment, comprising:
    maximizing a strong classifier by maximizing a function $$F(p) = \sum_{m=1}^{M} \frac{2}{\pi} \arctan(g_m A_m^T I(W(u; p)) - t_m),$$

wherein:
    p represents shape parameters for an image;
    m represents an iteration number;
    $g_m$ has a value of ±1;
    $A_m^T$ represents a feature template;
    $I(W(u;p))$ represents the image warped to a shape template; and
    $t_m$ represents a threshold.

19. A method for image alignment, comprising:
    determining ground truth shape parameters using a shape model, wherein the shape model comprises a weighted linear combination of a plurality of shape bases, and the weights comprise the ground truth shape parameters;
    warping image data according to the ground truth shape parameters to create positive samples; and
    training an appearance model based on positive and negative classes of input, wherein the positive class of input comprises the positive samples.

20. A method for image alignment, comprising:
iteratively updating application of a template to an image by maximizing a strong classifier score, wherein the strong classifier score is defined by the equation $$F(p) = \sum_{m=1}^{M} \frac{2}{\pi} \arctan(g_m A_m^T I(W(u; p)) - t_m),$$

wherein:
p represents shape parameters for an image;
m represents an iteration number;
$g_m$ has a value of ±1;
$A_m^T$ represents a feature template;
$I(W(u;p))$ represents the image warped to a shape template; and
$t_m$ represents a threshold.

* * * * *